(12) United States Patent
Kojima et al.

(10) Patent No.: US 9,640,999 B2
(45) Date of Patent: May 2, 2017

(54) POWER SYSTEM STABILIZER

(71) Applicants: Yasuhiro Kojima, Tokyo (JP); Yusuke Takaguchi, Tokyo (JP); Masanobu Koshio, Tokyo (JP); Marta Marmiroli, Tokyo (JP)

(72) Inventors: Yasuhiro Kojima, Tokyo (JP); Yusuke Takaguchi, Tokyo (JP); Masanobu Koshio, Tokyo (JP); Marta Marmiroli, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 378 days.

(21) Appl. No.: 14/376,495

(22) PCT Filed: Feb. 19, 2013

(86) PCT No.: PCT/JP2013/053952
§ 371 (c)(1),
(2) Date: Aug. 4, 2014

(87) PCT Pub. No.: WO2013/140916
PCT Pub. Date: Sep. 26, 2013

(65) Prior Publication Data
US 2015/0001939 A1 Jan. 1, 2015

(30) Foreign Application Priority Data
Mar. 19, 2012 (JP) .................. 2012-061401

(51) Int. Cl.
H02J 4/00 (2006.01)
G06G 7/14 (2006.01)
(Continued)

(52) U.S. Cl.
CPC .............. *H02J 4/00* (2013.01); *G06G 7/14* (2013.01); *H02J 3/24* (2013.01); *H02J 3/32* (2013.01);
(Continued)

(58) Field of Classification Search
CPC ........ H02J 4/00; H02J 3/24; H02J 3/32; H02J 3/48; H02J 3/381; H02J 3/382; G06G 7/14; Y10T 307/549; Y02E 70/30
(Continued)

(56) References Cited

U.S. PATENT DOCUMENTS

| 8,338,987 B2 | 12/2012 | O'Brien et al. |
| 8,527,106 B2 | 9/2013 | Muneshima et al. |
| 2011/0210613 A1 | 9/2011 | O'Brien et al. |

FOREIGN PATENT DOCUMENTS

| CN | 101510686 A | 8/2009 |
| CN | 102170249 A | 8/2011 |
(Continued)

OTHER PUBLICATIONS

International Search Report Issued May 7, 2013 in PCT/JP13/053952 Filed Feb. 19, 2013.
(Continued)

*Primary Examiner* — Hal Kaplan
(74) *Attorney, Agent, or Firm* — Oblon, McClelland, Maier & Neustadt, L.L.P.

(57) ABSTRACT

A technique with which a change in power frequency can be suppressed. A power system stabilizer issues a control command to a first storage battery among a plurality of first power generators and the first storage battery that are connected to an isolated island system via a first tie-line. The power system stabilizer includes a parameter determination unit and a control block unit. The parameter determination unit obtains, on the basis of operation information, a rate-
(Continued)

of-change limit value that indicates a limit to be imposed on a total value of changes in the overall output of first power generators in operation. The control block unit generates a command value to be given to the first storage battery on the basis of an interconnection point power flow value measured on the first tie-line and the rate-of-change limit value obtained by the parameter determination unit.

8 Claims, 11 Drawing Sheets

(51) Int. Cl.
    *H02J 3/24*     (2006.01)
    *H02J 3/32*     (2006.01)
    *H02J 3/48*     (2006.01)
    *H02J 3/38*     (2006.01)

(52) U.S. Cl.
    CPC ................ *H02J 3/48* (2013.01); *H02J 3/382* (2013.01); *Y02E 70/30* (2013.01); *Y10T 307/549* (2015.04)

(58) Field of Classification Search
    USPC .......................................................... 307/52
    See application file for complete search history.

(56) References Cited

FOREIGN PATENT DOCUMENTS

| | | |
|---|---|---|
| JP | 2007 228737 | 9/2007 |
| JP | 2009 27797 | 2/2009 |
| JP | 2009 125834 | 10/2009 |
| JP | 2011 114900 | 6/2011 |
| JP | 2011 114945 | 6/2011 |
| JP | 2011 151961 | 8/2011 |

OTHER PUBLICATIONS

Combined Office Action and Search Report issued Feb. 2, 2016 in Chinese Patent Application No. 201380014513.1 (with Partial English translation and English translation of the Search Report).

Shi-jie Cheng, et al., "Energy Storage and its Application in Power System Stability Enhancement" Power System Technology, vol. 31, No. 20, Oct. 2007, pp. 97-108.

Yang Yu, et al., "Frequency stability of power system and its statistic characterstics" Journal of Zhejiang University (Engineering Science), vol. 44, No. 3, Mar. 2010, pp. 550-556 (with English Abstract).

International Preliminary Report on Patentability issued Oct. 2, 2014 in PCT/JP2013/053952 filed Feb. 19, 2013.

Written Opinion issued May 7, 2013 in PCT/JP2013/053952 filed Feb. 19, 2013 (with English translation).

U.S. Appl. No. 14/704,398, filed May 5, 2015, Takaguchi, et al.

POWER SYSTEM STABILIZER

TECHNICAL FIELD

The present invention relates to a power system stabilizer that issues a control command to a storage battery among a plurality of power generators and the storage battery that are connected via a tie-line to an independent power supply system provided in, for example, an isolated island.

BACKGROUND ART

Power plants adjust the supply of electric power from power generators in accordance with ever-changing electric power demand. The phase "changing electric power demand" as used herein includes not only fluctuations in the amount of electric power consumed by a consumer, but also fluctuations in the amount of natural energy generation such as wind power generation or photovoltaic power generation in power plants built by a consumer or a power generation dealer, and fluctuations due to accidental disconnection.

Frequencies of electric power supplied from power generators are characterized in that they decrease with increasing demand and increase with decreasing demand. However, a significant deviation of the power frequencies from a prescribed value may adversely affect consumer's equipment, and yet it is expected that a more significant deviation may have an influence on power generation facilities, and in the worst case, may cause a power failure. In view of this, the power plants manage the supply and demand of electric power by balancing it so that the power frequencies are maintained at prescribed values. Normally, when a frequency drift has been detected, a power generator or a power generator control apparatus performs control for returning the frequency to a prescribed value by adjusting the amount of fuel input to the power generator in accordance with the frequency drift so as to adjust the supply of electric power.

However, since such control is generally performed after a delay and is thus too late when the rate of change in supply-and-demand balance exceeds a threshold value, the frequency drift continues to occur for a while. Note that the threshold value varies depending on the operating conditions of power generators (a total of rated outputs of power generators that are in operation). For example, the threshold value increases with increasing total value of the rated output values of power generators in operation, thus allowing the power generators to follow a great rate of change.

While the electric power supplied from the power generators has characteristics as described above, recent progress in the introduction of power generators that convert natural energy having a threshold value liable to variation into electric energy will be considered to lead to an increase in the possibility of occurrence of phenomena in which frequencies are unstable as described above. In view of this, many techniques such as disclosed in Patent Document 1 are being considered, in which frequencies are stabilized by additionally providing a storage battery facility (hereinafter, simply referred to as a "storage battery") that includes a capacitor and an inverter board and causing the output of the storage battery to follow demand fluctuations that are unable to be appropriately followed by power generators. Such a system stabilization technique is being considered for use not only in isolated islands but also in large-scale electric power systems.

PRIOR ART DOCUMENTS

Patent Document

Patent Document 1: International Publication No. WO 2009/125834

SUMMARY OF THE INVENTION

Problems to be Solved by the Invention

In a small-scale independent power supply system provided in, for example, an isolated island, a change in supply-and-demand balance has a particularly significant influence on frequency. As described above, the amount of deviation of supply-and-demand balance and the magnitude of change in frequency vary depending on operating conditions of power generators at that time.

In view of this, Patent Document 1 discloses a method in which a controller determines a gain G of stabilizing a system from time constants T1 and T2, but it does not specify a method itself for determining the time constants T1 and T2. It can be thought that the time constants T1 and T2 need to be predetermined by predicting the operating conditions of power generators.

However, the number of power generators to be operated throughout a day tends to become large during the day and become small at night, and the numbers of power generators to be activated and stopped are generally changed with a change in demand. It is thus difficult to determine the appropriate time constants T1 and T2 in advance. In particular, in the case where the technique disclosed in Patent Document 1 is applied to an isolated island system and the operating conditions of power generators are different from the above predicted conditions, frequencies may not immediately be returned to a prescribed value due to an insufficient amount of control of the storage battery or may fluctuate in the opposite direction due to an excessive amount of control, or even an oscillation phenomenon may occur if the gain is high.

The present invention has been conceived in light of problems as described above, and it is an object of the present invention to provide a technique that allows a change in power frequency to be suppressed.

Means for Solving the Problem

A power system stabilizer according to the present invention issues a control command to a first storage battery among a plurality of first power generators and the first storage battery that are connected to an independent system for power supply via a first tie-line. The power system stabilizer includes a parameter determination unit that obtains a rate-of-change limit value on the basis of operation information that includes information regarding those of the first power generators that are in operation, the rate-of-change limit value indicating a limit to be imposed on a total value of changes in an overall output of the first power generates in operation, and a control block unit that generates a command value to be given to the first storage battery on the basis of an interconnection point power flow value measured on the first tie-line and the rate-of-change limit value obtained by the parameter determination unit, the interconnection point power flow value being a total value of outputs of the first power generators and the first storage battery.

Advantageous Effects of the Invention

According to the present invention, the rate-of-change limit value indicating a limit to be imposed on the total value of changes in the overall output of the first power generators in operation is obtained on the basis of the ever-changing operation information regarding the first power generators, and the command value to be given to the first storage battery is generated on the basis of the interconnection point power flow value and the rate-of-change limit value. Accordingly, even if the operating conditions of the first power generators or the interconnection point power flow value changes, the power system stabilizer can handle such a change by primarily using the output of the first storage battery. In addition, since a change in the overall output of the first power generators in operation can be limited so as to not adversely affect the power frequency, it is possible to suppress a change in power frequency.

DESCRIPTION OF EMBODIMENTS

First Embodiment

Before giving a description of power system stabilizers according to embodiments of the present invention, a power system stabilizer related thereto (hereinafter, referred to as a "relevant power system stabilizer") will be described.

Figure 15:
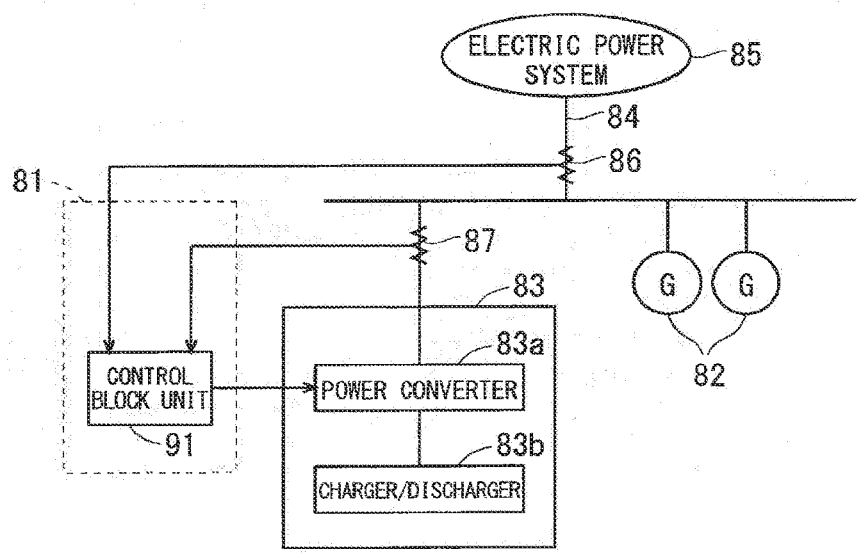
FIG. 15 is a block diagram showing configurations of a relevant power system stabilizer and a power-system stabilization system that includes the relevant power system stabilizer.

FIG. 15 is a block diagram showing configurations of the relevant power system stabilizer and a power-system stabilization system that includes the relevant power system stabilizer. As shown in FIG. 15, a relevant power system stabilizer 81, a plurality of power generators 82, and a storage battery 83 are connected to an electric power system 85 via a tie-line 84. The electric power system 85 discussed here is assumed to be a small-scale independent system for power supply provided in an isolated island, and the relevant power system stabilizer 81, the power generators 82, and the storage battery 83 constitute a distributed power distribution system (micro grid) that is responsible for some functions of the electric power system 85.

The power generators 82 introduced in the isolated island have their governors designed to have the same control characteristics responsive to a change in demand, and outputs (electric power supplies) of the respective power generators 82 are adjusted so as to equally follow a load (electric power demand). A configuration is thus such that when fluctuations such as a sudden change in demand, fluctuations in output of natural energy, or sharp load fluctuations associated with disconnection due to a failure or an accident in natural energy power generators have occurred, the power generators 82 that are in operation share the output corresponding to the amount of fluctuations in an equal ratio. With these power generators 82, it is possible to somewhat handle a change in electric power demand.

However, if a change in electric power demand is too abrupt, although the outputs of the power generators 82 may be able to respond to the abrupt change, a fuel system serving as a power source of the power generators 82 (e.g., a diesel motor for internal combustion power generators, or a boiler for steam power generators) cannot follow and respond to that change instantaneously because of its slow response speed. Thus, in this case, there occurs a great alienation in terms of rotational energy of rotors of the power generators 82 between the amount of energy supplied through mechanical input of the fuel system and the amount of energy consumed by conversion into electric energy. If such a state of unbalance between the supply and demand of electric power continues as a result, the rotational energy of the power generators will decrease or increase from a reference value, causing an instability phenomenon in which the frequency of the entire system decreases or increases gradually.

The instability phenomenon will appear more remarkably as the scale of the electric power system becomes smaller. In view of this, the storage battery 83 that is capable of performing high-speed power control at a stable frequency is provided in the case where it is envisaged that a large amount of natural energy electric power is to be introduced into a small-scale electric power system such as the one provided in an isolated island. With such a configuration including the storage battery 83, the instability phenomenon of frequency can be suppressed more reliably.

Next, exemplary configurations of the storage battery 83 and the relevant power system stabilizer 81 will be described.

As shown in FIG. 15, the storage battery 83 includes, for example, a power converter 83a constituted by an inverter and so on, and a charger/discharger 83b such as an electric double layer capacitor. The power converter 83a converts alternating-current power that is input to the storage battery 83 into direct-current power and charges the charger/discharger 83b with the direct-current power, or converts direct-current power discharged from the charger/discharger 83b into alternating-current power and outputs the alternating-current power to the outside of the storage battery 83, in response to a control command received from the relevant power system stabilizer 81.

The relevant power system stabilizer 81 includes a control block unit 91. The control block unit 91 outputs a control command to the power converter 83a on the basis of the frequencies of electric power detected by detectors 86 and 87.

Figure 16:
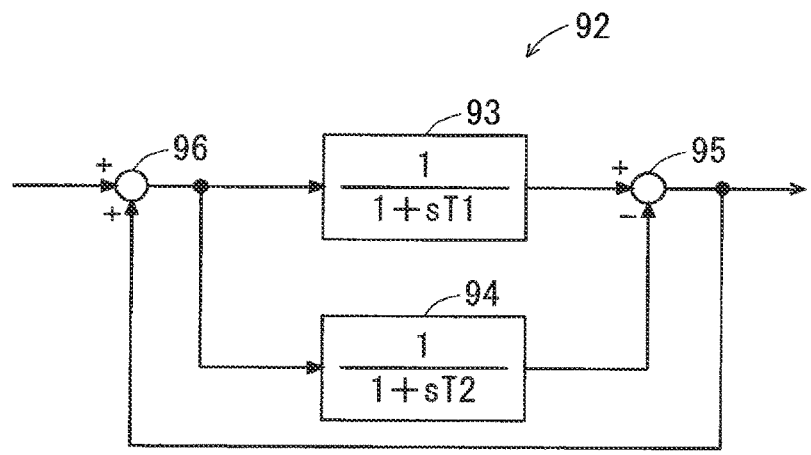
FIG. 16 is a block diagram showing a configuration of a fluctuation detection block of the relevant power system stabilizer.

FIG. 16 is a block diagram showing a configuration of a fluctuation detection block 92 provided in the control block unit 91. As shown in FIG. 16, the fluctuation detection block 92 of the control block unit 91 includes first and second filters 93 and 94 having first-order lag characteristics, a subtractor 95, and an adder 96. Assume here that f1 is the high-pass cutoff frequency and f2 is the low-pass cutoff frequency in the pass band of frequencies of the fluctuation detection block 92.

The first filter 93 is a low-pass filter for noise removal and having a cut-off frequency f1 and a time constant T1 (=1/(f1)). The second filter 94 is a low-pass filter for setting a fluctuation detection time, and having a cut-off frequency f2 and a time constant T2(=1/(f2)). The subtractor 95 performs a subtraction on the basis of a signal output from the first filter 93 and a signal output from the second filter 94, and outputs the subtraction result. The adder 96 constitutes a feedback circuit that gives the feedback of the output of the subtractor 95 to the first and second filters 93 and 94.

In the case where a micro grid constituted by the relevant power system stabilizer 81 as described above operates as an independent system, a change in power frequency is detected to correct (control) the output of the storage battery 83. However, as described above, since a frequency change occurs gradually in accordance with the deviation of the supply-and-demand balance, a frequency drift cannot be reduced in a short time as long as the output of the storage battery 83 is controlled after the detection of a frequency change. Besides, since the numbers of power generators 82 to be activated and stopped are changed in accordance with a change in demand, it is difficult to determine the appropriate time constants T1 and T2 in advance.

In contrast, a power system stabilizer according to any one of first to third embodiments of the present invention can suppress a change in power frequency. The following is a description of such a power system stabilizer.

Figure 1:
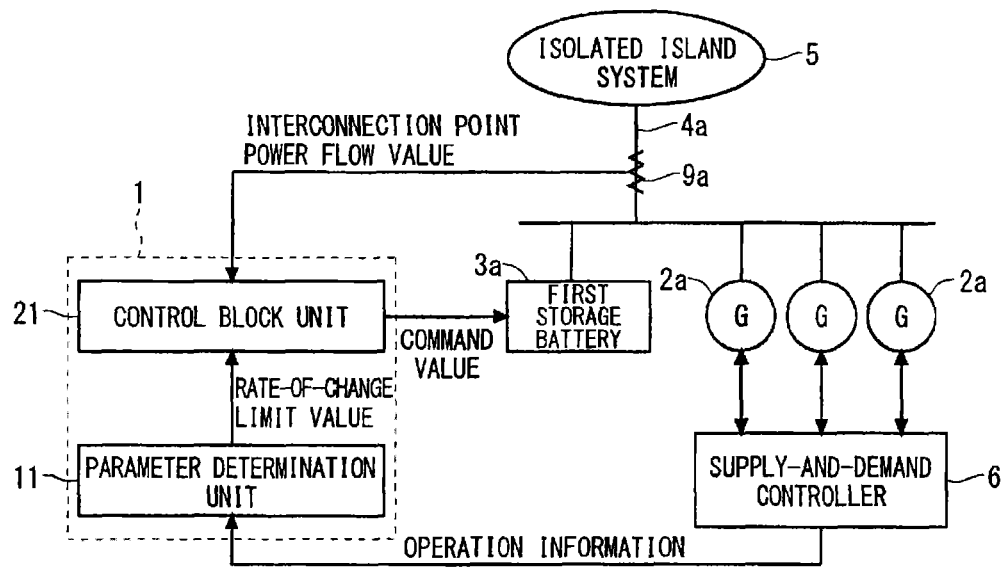
FIG. 1 is a block diagram showing configurations of a power system stabilizer according to a first embodiment and a power-system stabilization system that includes the power system stabilizer of the first embodiment.

FIG. 1 is a block diagram showing configurations of a power system stabilizer according to a first embodiment of the present invention, and a power-system stabilization system that includes the power system stabilizer of the first embodiment. As shown in FIG. 1, a power system stabilizer 1, a plurality of first power generators 2a, and a first storage battery 3a are connected to an isolated island system 5 (an independent system for power supply provided in an isolated island) via a first tie-line 4a. Assume here that the power system stabilizer 1, the first power generators 2a, and the first storage battery 3a are provided in the same power plant. The first power generators 2a and the first storage battery 3a are respectively similar to the power generators 82 and the storage battery 83 described above, and therefore a description thereof has been omitted.

A supply-and-demand controller 6 controls activation and output of the first power generators 2a by outputting activation commands and output commands to the first power generators 2a while checking the supply-and-demand balance in the isolated island system 5. The supply-and-demand controller 6 also periodically outputs operation information that includes information regarding the first power generators 2a that are in operation, to the power system stabilizer 1. Assume here that the operation information is information indicating a total value of rated outputs of all the first power generators 2a that are currently in operation.

A first measuring instrument 9a provided on the first tie-line 4a periodically measures a total value of outputs (effective electric power) of the first power generators 2a and the first storage battery 3a on the first tie-line 4a. The total value measured with the first measuring instrument 9a may also be hereinafter referred to as an "interconnection point power flow value" or a "first interconnection point power flow value." The first measuring instrument 9a periodically outputs the measured interconnection point power flow value to the power system stabilizer 1.

The power system stabilizer 1 issues, to the first storage battery 3a, a control command to control the output of the first storage battery 3a on the basis of the operation information received from the supply-and-demand controller 6 and the interconnection point power flow value received from the first measuring instrument 9a. In the present embodiment, the power system stabilizer 1 includes a parameter determination unit 11 and a control block unit 21 as shown in FIG. 1.

The parameter determination unit 11 obtains a rate-of-change limit value (output rate-of-change limit value) that indicates a limit to be imposed on a total value of changes in the overall output of the first power generators 2a that are in operation, on the basis of the operation information received from the supply-and-demand controller 6, and outputs the rate-of-change limit value to the control block unit 21. The control block unit 21 generates a command value (control command) to be given to the first storage battery 3a on the basis of the interconnection point power flow value (the total value of the outputs of the first power generators 2a and the first storage battery 3a on the first tie-line 4a) received from the first measuring instrument 9a and the rate-of-change limit value obtained by the parameter determination unit 11, and outputs the command value to the first storage battery 3a.

Figure 2:
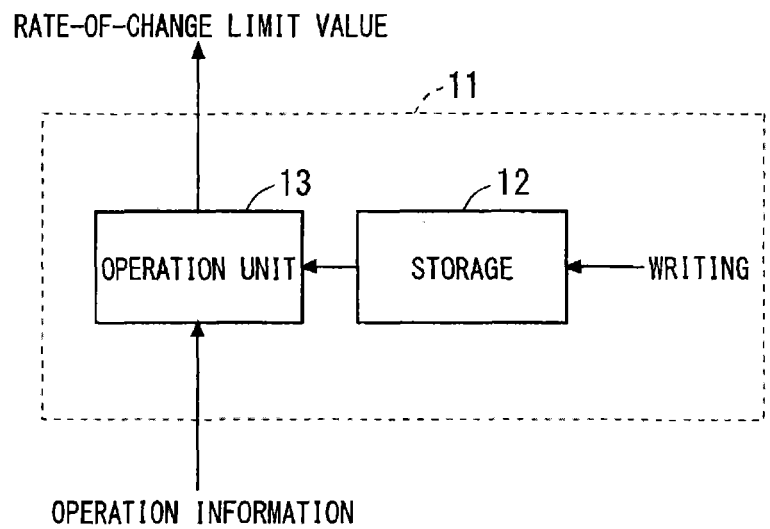
FIG. 2 is a block diagram showing a configuration of a parameter determination unit according to the first embodiment.

FIG. 2 is a block diagram showing a configuration of the parameter determination unit 11. As shown in FIG. 2, the parameter determination unit 11 includes a storage 12 and an operation unit 13.

The storage 12 stores a rate limit value (predetermined limit value) that is rewritable with some sort of rewriting means such as a keyboard, a touch panel, or communication means. For example, if the amount of change in the output of a first power generator 2a in operation during one minute falls within 3% of the rated output of the first power generator 2a and has little influence on the frequency of electric power that is output from the first power generator 2a, the rate limit value is defined as 3% per minute. In other words, a value obtained by dividing the amount of change in the output of a first power generator 2a in operation, which has little influence on the power frequency of the first power generator 2a, by the rated output of the first power generator 2a is stored as a rate limit value. In the present example, it is assumed that all of the first power generators 2a in the isolated island are adjusted to have the same rate limit value.

The operation unit 13 calculates a rate-of-change limit value by performing a multiplication expressed by the following equation (1) on the basis of the above-described rate limit value stored in the storage 12 and the operation information (in the present example, the total value of the rated outputs of all the first power generators 2a in operation) received from the supply-and-demand controller 6. The operation unit 13 then outputs the calculated rate-of-change limit value to the control block unit 21.

[Equation 1]

Rate-of-Change Limit Value="Rate Limit Value"×
"Total of Rated Outputs of First Power Generators in Operation" (1)

As described above, the rate-of-change limit value indicates a limit to be imposed on the total value of changes in the overall output of the first power generators 2a in operation. Accordingly, by using the calculated rate-of-change limit value to limit the amount of change in the overall output of the first power generators 2a in operation, it is possible to limit the amount of change in the overall output of the first power generators 2a in operation within a range in which the interconnection point power flow value can be changed without affecting the power frequency.

While the above description takes the example of the case in which the operation information indicates the total value of the rated outputs of all the first power generators 2a in operation, the operation information is not limited thereto as long as it includes information regarding the first power generators 2a in operation. For example, in the case where a plurality of first power generators 2a are adjusted to have the same rated output and the storage 12 stores the rated output (predetermined information) per first power generator 2a together with the above rate limit value, the operation information may be information indicating the number of first power generators 2a that are in operation. In this case, the operation unit 13 calculates the rate-of-change limit value by multiplying the rate limit value, the rated output per first power generator 2a, and the number of first power generators 2a in operation.

As another example, in the case where a plurality of first power generators 2a have different rated outputs and the storage 12 stores the rated outputs of the respective first power generators 2a together with the above-described rate limit value, the operation information may be information indicating ON and OFF of the first power generators 2a. In this case, the operation unit 13 calculates the rate-of-change limit value by multiplying the rate limit value and a total value of the rated outputs of first power generators 2a that are in the ON state.

Figure 3:
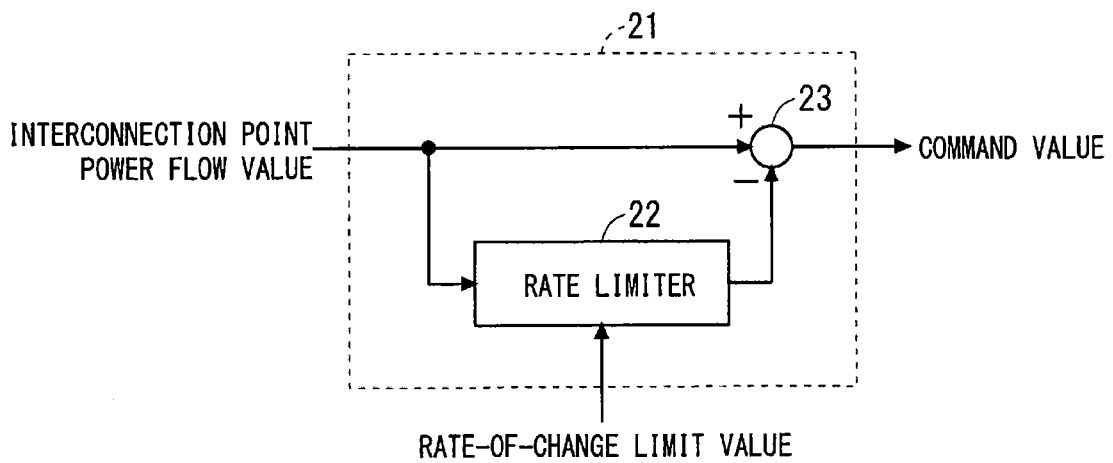
FIG. 3 is a block diagram showing a configuration of a control block unit according to the first embodiment.

FIG. 3 is a block diagram showing a configuration of the control block unit 21. As shown in FIG. 3, the control block unit 21 includes a rate limiter 22 and a subtractor 23.

The rate limiter 22 receives input of the interconnection point power flow value from the first measuring instrument 9a and the rate-of-change limit value from the parameter determination unit 11. The rate limiter 22 is a circuit that generates the interconnection point power flow value whose temporal change is limited by using the rate-of-change limit value. In the present embodiment, if a change in the input interconnection point power flow value is less than or equal to the rate-of-change limit value, the rate limiter 22 directly outputs the input interconnection point power flow value. On the other hand, if the amount of change in the input interconnection point power flow value exceeds the rate-of-change limit value, the rate limiter 22 modifies the amount of change in the input interconnection point power flow value such that the amount of change becomes equal to the rate-of-change limit value, and outputs the calculated interconnection point power flow value.

Figure 4:
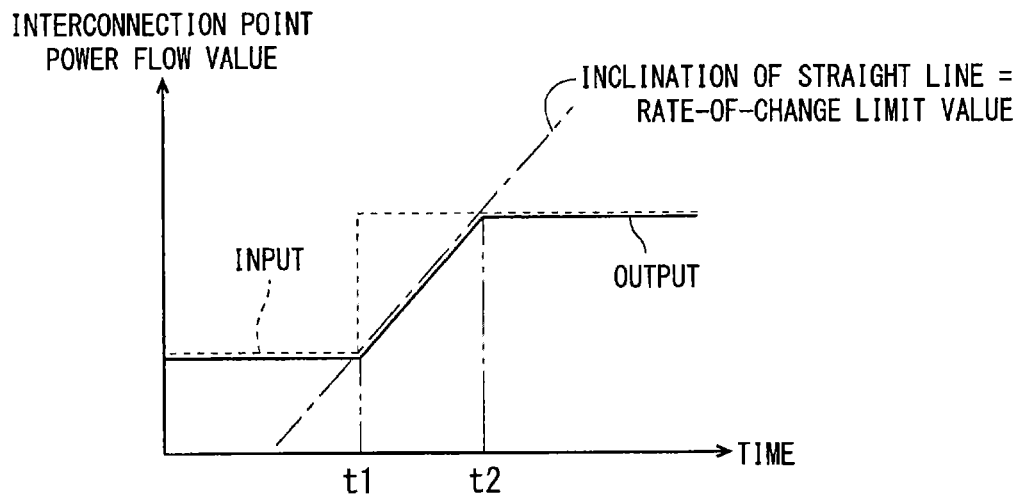
FIG. 4 illustrates operations performed by a rate limiter according to the first embodiment.

FIG. 4 illustrates operations performed by the rate limiter 22. In FIG. 4, the interconnection point power flow value that is input to the rate limiter 22 is indicated by the broken line, a straight line having an inclination that corresponds to the rate-of-change limit value is indicated by the dashed dotted line, and the interconnection point power flow value that is output from the rate limiter 22 is indicated by the solid line. When the input interconnection point power flow value changes stepwise as shown in FIG. 4, the rate limiter 22 outputs an interconnection point power flow value that changes along the inclination of the rate-of-change limit value for a while (in the example of FIG. 4, a period of time from t1 to t2). Then, the rate limiter 22 directly outputs the input interconnection point power flow value from and after the point in time (in the example of FIG. 4, time t2) when the input interconnection point power flow value becomes equal to the output interconnection point power flow value.

Referring back to FIG. 3, the subtractor 23 receives input of the interconnection point power flow value from the first measuring instrument 9a and the interconnection point power flow value from the rate limiter 22. The subtractor 23 generates, as the command value, a difference between the interconnection point power flow values before and after a change is limited by the rate limiter 22 (a difference between the interconnection point power flow value received from the first measuring instrument 9a and the interconnection point power flow value received from the rate limiter 22). A signal that indicates the command value generated by the subtractor 23 is output to the first storage battery 3a in the form of an analog or digital value.

When having received the command value from the power system stabilizer 1, the first storage battery 3a outputs an electric power value that corresponds to the command value. Note that the supply-and-demand controller 6 receives the output value of the rate limiter 22 or generates the same value on its own, and controls the outputs of the first power generators 2a in operation on the basis of the received or generated value.

Figure 5A:
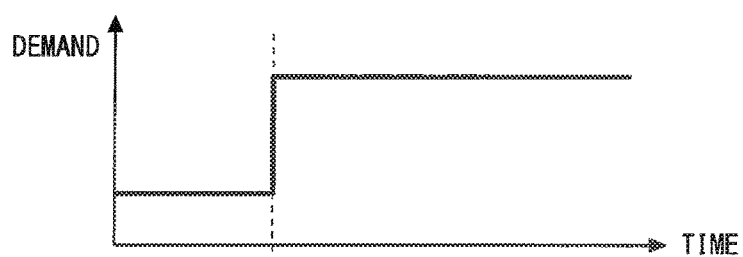
FIG. 5A to FIG. 5D each illustrates operations to be compared with those of the power system stabilizer according to the first embodiment.
Figure 5B:
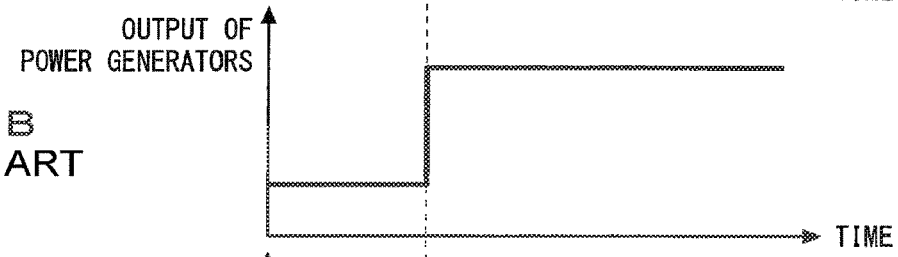
Figure 5C:
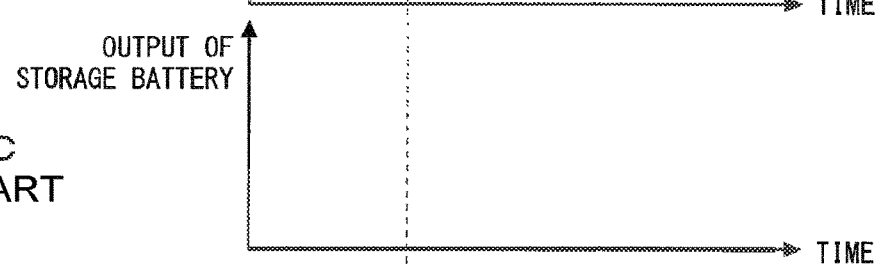
Figure 5D:
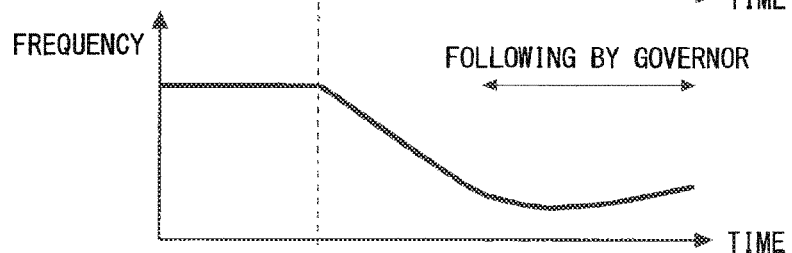
Figure 6A:
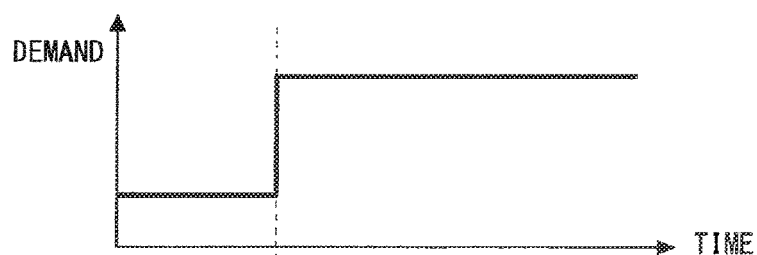
FIG. 6A to FIG. 6D each illustrates operations to be compared with those of the power system stabilizer according to the first embodiment.
Figure 6B:
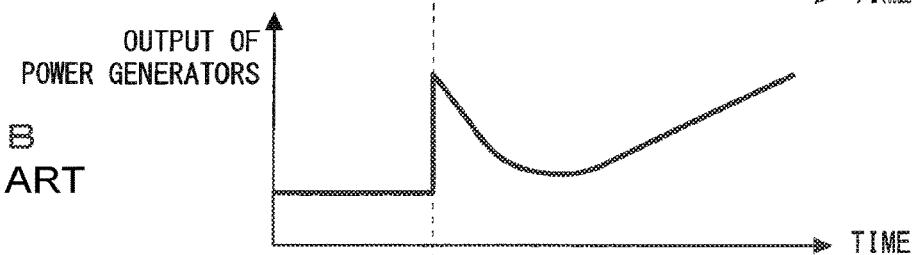
Figure 6C:
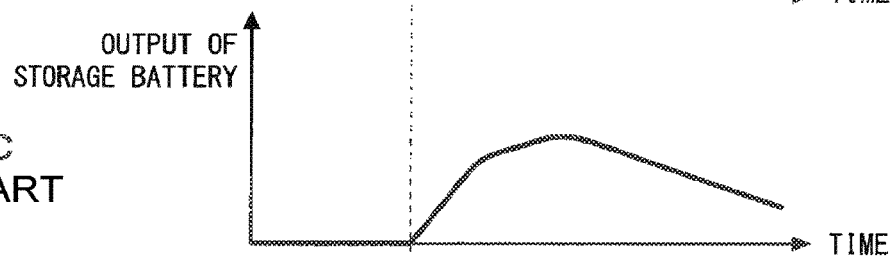
Figure 6D:
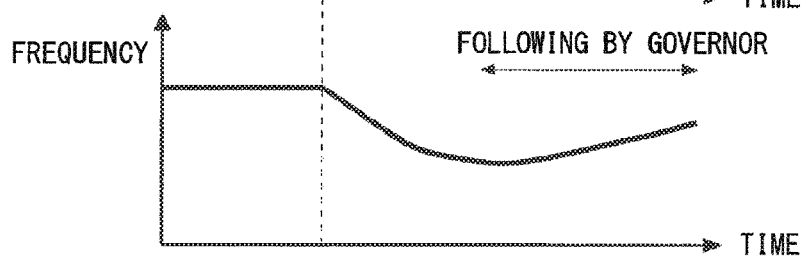
Figure 7A:
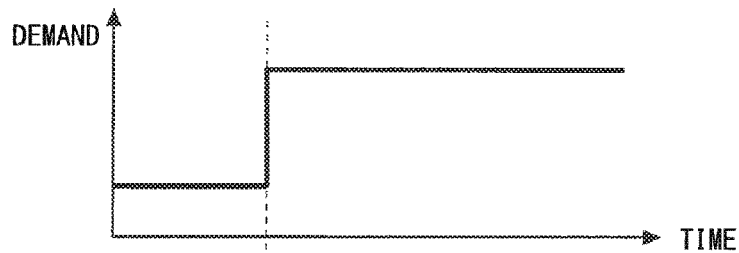
FIG. 7A to FIG. 7D each illustrates operations performed by the power system stabilizer according to the first embodiment.
Figure 7B:
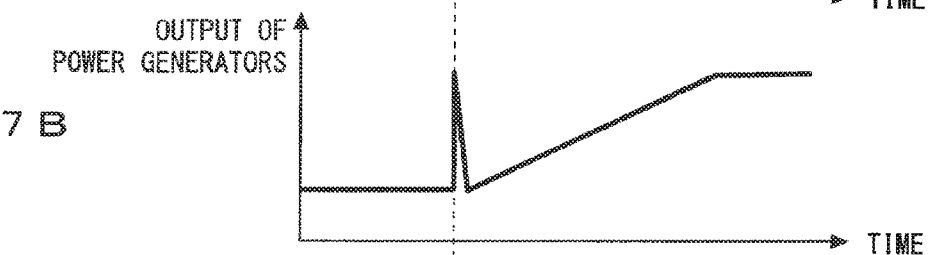
Figure 7C:
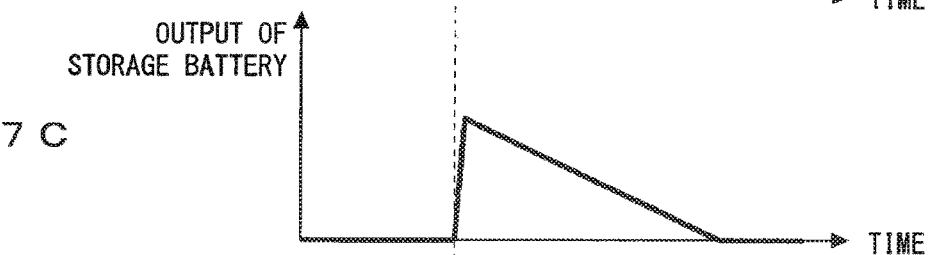
Figure 7D:
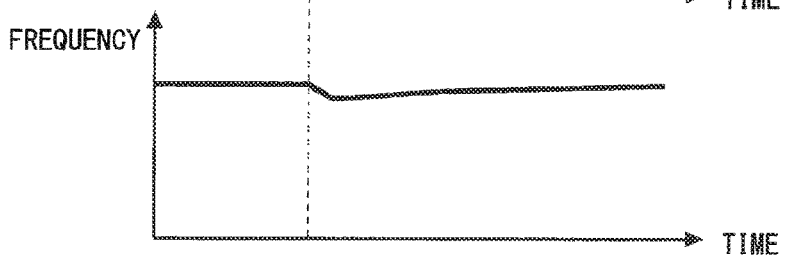

FIGS. 5A to 7D illustrate the effects of the power system stabilizer 1 having the above-described configuration according to the present embodiment. Note that FIG. 7A to FIG. 7D each illustrates operations implemented by the power system stabilizer 1 according to the present embodiment, and FIGS. 5A to 5D and 6A to 6D illustrate operations to be compared with those of the power system stabilizer 1 according to the present embodiment. FIGS. 5A, 6A, and 7A illustrate a temporal change in electric power demand, FIGS. 5B, 6B, and 7B illustrate a temporal change in the outputs of the power generators, FIGS. 5C, 6C, and 7C illustrate a temporal change in the output of the storage battery, and FIGS. 5D, 6D, and 7D illustrate a temporal change in the output frequency of the storage battery.

FIG. 5A to FIG. 5D each illustrates operations performed in the case where the output of the first storage battery 3a is not adjusted. In this case, the first storage battery 3a does not follow the stepwise increase in electric power demand as shown in FIG. 5C, and only the first power generators 2a follow the stepwise increase as shown in FIG. 5B. As described above, since the prime-motor side control by the governor is too late to follow the increase, the amount of energy consumed by conversion into electric energy becomes greater than the amount of energy supplied through mechanical input of the prime motor in terms of the rotational energy of rotors of the first power generators 2a.

Consequently, the power frequency drops significantly as shown in FIG. 5D. Although this frequency drop is later detected by the governor and the power frequency is getting recovered by an increase in rotational energy given from the prime motor side, it is envisaged that such a temporal power frequency drop will adversely affect the consumer's equipment.

FIG. 6A to FIG. 6D each illustrates operations performed in the case where the output of the first storage battery 3a is adjusted, and the outputs of the first power generators 2a and the first storage battery 3a are controlled on the basis of frequency measurement information. In this case, the output of the first storage battery 3a increases in response to a stepwise increase in electric power demand as shown in FIG. 6C. However, since control is performed by detecting an actual frequency drift and comparing it with the frequency reference value, no control is performed during a period in which a frequency change is small. Thus, the output of the first storage battery 3a increases only gradually.

Consequently, although frequency fluctuations (instability phenomenon of frequency) can be suppressed more successfully as shown in FIG. 6D than in the case of FIG. 5D (the case where the output of the first storage battery 3a is not adjusted), the fluctuations are relatively large and the period of the fluctuations is relatively long. Note that if it is only necessary to accelerate the rising of the output of the first storage battery 3a, a method of increasing gain or a method of adding differential control is conceivable.

FIG. 7A to FIG. 7D each illustrates operations implemented by the power system stabilizer 1 according to the present embodiment. The outputs of the first power generators 2a instantaneously follow a stepwise increase in electric power demand as shown in FIG. 7B, whereas the change in electric power demand is detected as an interconnection point power flow value. If the change indicated by the interconnection point power flow value is so large as to affect the power frequencies of the first power generators 2a, the power system stabilizer 1 causes the first power generators 2a to output electric power within a range in which the power frequencies of the first power generators 2a are not affected, and also immediately instructs the first storage battery 3a to output a difference between the interconnection point power flow value and the outputs of the first power generators 2a.

Thus, as shown in FIG. 7C, the amount of change in electric power demand is offset by the output of the first storage battery 3a, and the outputs of the first power generators 2a immediately return to substantially their original value (decrease). Consequently, the outputs of the first power generators 2a do not affect the frequency, and accordingly a change in power frequency is very small as shown in FIG. 7D.

Next, exemplary operations performed in the case where a system accident due to lightning sparks or the like has occurred in an isolated island system will be described with reference to FIGS. 8 and 9. FIG. 9 illustrates operations implemented by the power system stabilizer 1 according to the present embodiment, and FIG. 8 illustrates operations to be compared with those of the power system stabilizer 1 according to the present embodiment.

Figure 8:
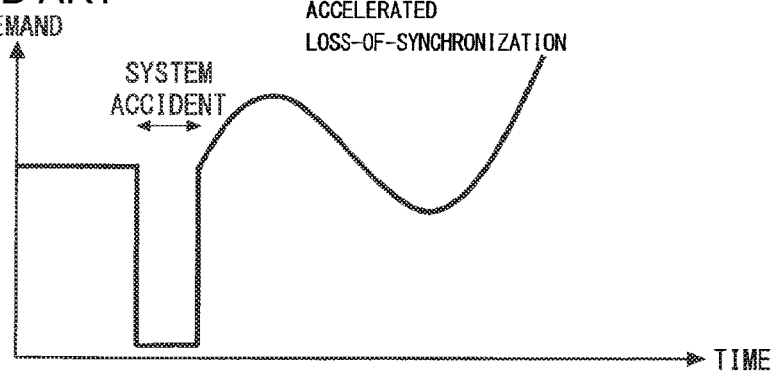
FIG. 8 illustrates operations to be compared with those of the power system stabilizer according to the first embodiment.
Figure 9:
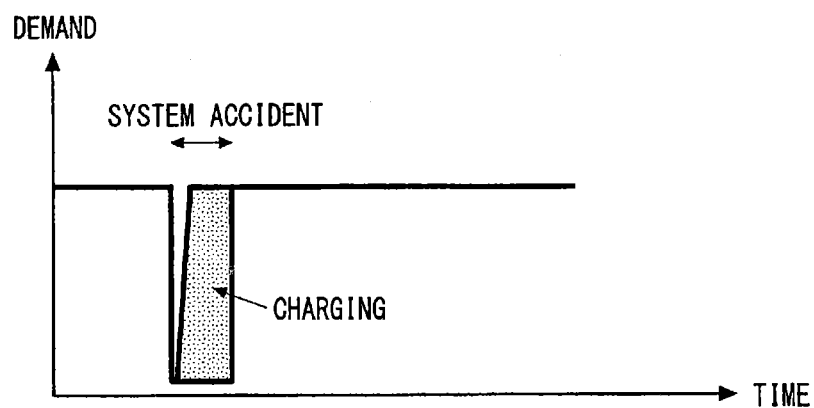
FIG. 9 illustrates operations performed by the power system stabilizer according to the first embodiment.

FIG. 8 illustrates operations performed in the case where the output of the first storage battery 3a is not adjusted. If a system accident has occurred in this case, the first power generators 2a become unable to transmit electric power to the isolated island system 5 because the power transmission line loses its power transmission capability during the accident. However, as described above, the prime motor of the first power generators 2a cannot control output immediately.

Accordingly, the amount of energy supplied through mechanical input becomes greater than the amount of energy consumed by conversion into electric energy in terms of the rotational energy of the rotors of the first power generators 2a, and the power frequency increases on the local side (on the side of the power system stabilizer 1, the first power generators 2a, and the first storage battery 3a). This may cause, depending on the duration time of the accident and the operating conditions of the first power generators 2a, a significant difference between the phase angle on the isolated island system 5 side and the phase angle of the first power generators 2a after a return from the accident, resulting in a loss of synchronization. Consequently, an accelerated loss-of-synchronization phenomenon shown in FIG. 8 may occur.

In contrast, as shown in FIG. 9, in the case where the power system stabilizer 1 according to the present embodiment is introduced, the power system stabilizer 1 issues a charging command to the first storage battery 3a when having detected a decrease in the interconnection point power flow value due to a system accident, so that the first storage battery 3a is charged with excess outputs (electric energy) of the first power generators 2a. Accordingly, the mechanical input matches the electrical output in terms of the rotational energy of the first power generators 2a even during the accident. This brings about the effect of reducing a difference in phase angle and suppressing the occurrence of an accelerated loss-of-synchronization phenomenon.

In summary, the power system stabilizer 1 according to the present embodiment obtains the rate-of-change limit value, which indicates a limit to be imposed on the total value of changes in the overall output of the first power generators 2a in operation, on the basis of the ever-changing operation information regarding the first power generators 2a, and generates the command value to be given to the first storage battery 3a on the basis of the interconnection point power flow value and the rate-of-change limit value. Accordingly, even if the operating conditions of the first power generators 2a and the interconnection point power flow value are changed, the power system stabilizer 1 can handle these changes by using the output of the first storage battery 3a. In addition, a change in power frequency can be suppressed because a change in the overall output of the first power generators 2a in operation can be limited so as to not affect the power frequency. It is also possible to suppress the occurrence of an accelerated loss-of-synchronization phenomenon.

The above description takes the example of the case in which the power system stabilizer 1 and the first storage battery 3a are provided separately. The present embodiment is, however, not limited thereto, and for example, the first storage battery 3a may have a system stabilization function by functionally providing the parameter determination unit 11 and the control block unit 21 on a control panel of the first storage battery 3a.

Second Embodiment

For the above-described relevant power system stabilizer 81 shown in FIG. 15, there has recently been proposed control in which the interconnection point power flow value (the total value of the outputs of the power generators 82 and the storage battery 83 on the tie-line 84) is detected at the time of system interconnection, and a change in power flow due to fluctuations in load or in the output of a distributed power source inside the micro grid is smoothed by using the storage battery 83.

In actual operations, however, the electric power system 85 is not only connected to the local power generators 82 via the tie-line 84, but also connected to external power generators via another tie-line different from the tie-line 84. In such a configuration, if the supply-and-demand balance of the entire electric power system 85 changes, not only the local power generators 82 but also the external power generators will respond to the change.

Thus, in order to stabilize the supply-and-demand balance of the entire electric power system 85, it is considered not appropriate to take into consideration only the electric power output from the local power generators 82 and the storage battery 83 as in the proposed control method. In view of this, a power system stabilizer 1 according to a second embodiment of the present invention makes it possible to take into consideration the operating conditions of external power generators connected to the electric power system 85 via another tie-line 84.

Figure 10:
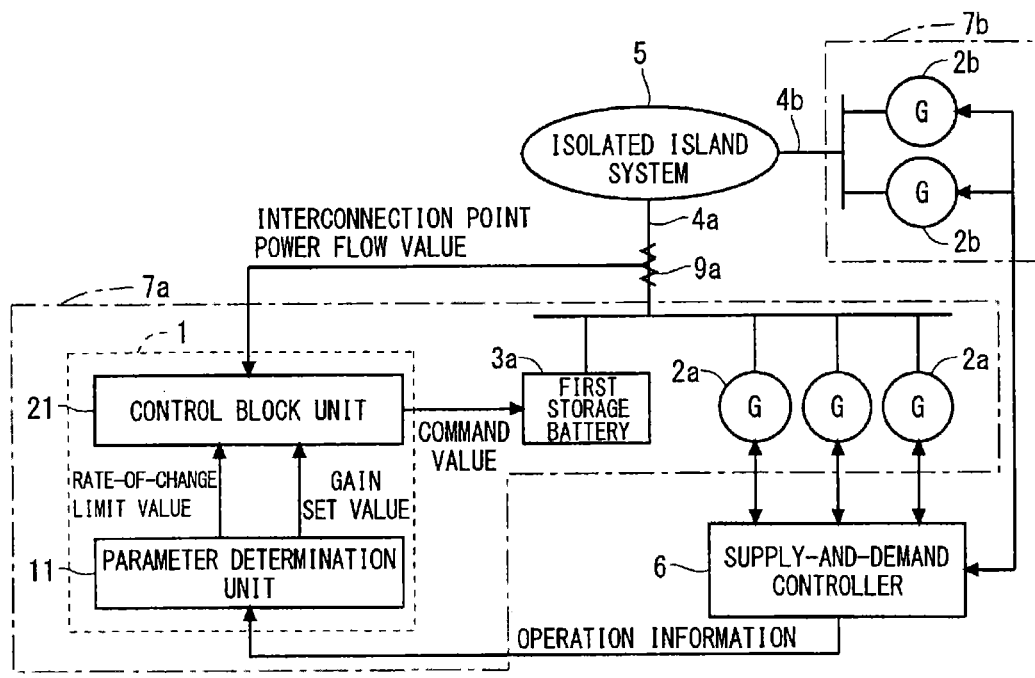
FIG. 10 is a block diagram showing a configuration of a power system stabilizer according to a second embodiment and a power-system stabilization system that includes the power system stabilizer of the second embodiment.

FIG. 10 is a block diagram showing configurations of the power system stabilizer according to the present embodiment and a power-system stabilization system that includes the power system stabilizer of the present embodiment. Note that in the power system stabilizer and so on according to the present embodiment, constituent elements that are the same as or similar to those described in the first embodiment are denoted by the same reference numerals, and the following description focuses on differences from the first embodiment.

As shown in FIG. 10, a plurality of second power generators (external power generators) are respectively connected to the isolated island system 5 via second to Nth tie-lines. While the following description takes the example of the case in which N=2, i.e., the case where a plurality of second power generators 2b are connected to the isolated island system 5 via a second tie-line 4b, the present invention is not limited thereto, and N may be any integer of 2 or more. It is assumed here that the power system stabilizer 1, the first power generators 2a (in the present example, local power generators), and the first storage battery 3a are provided in a local power plant 7a, and the second power generators 2b are provided in an external power plant 7b where no storage battery is provided.

In the present embodiment, the supply-and-demand controller 6 controls activation and output of the first and second power generators 2a and 2b by outputting activation commands and output commands to the first and second power generators 2a and 2b while checking the supply-and-demand balance in the isolated island system 5. The supply-and-demand controller 6 also periodically outputs operation information that includes information regarding the first and second power generators 2a and 2b that are in operation, to the power system stabilizer 1. Assume here that the operation information is information indicating a total value of rated outputs of all the first power generators 2a in operation and a total value of rated outputs of all the second power generators 2b in operation.

The parameter determination unit 11 of the power system stabilizer 1 obtains a rate-of-change limit value and a gain set value on the basis of the operation information including information regarding the first and second power generators 2a and 2b in operation, the rate-of-change limit value indicating a limit to be imposed on a total value of changes in the overall output of the first and second power generators 2a and 2b in operation.

That is, the parameter determination unit 11 according to the present embodiment obtains not only the rate-of-change limit value described in the first embodiment, but also the gain set value. The gain set value is a parameter for calculating the supply-and-demand balance in the entire isolated island system 5, the balance reflecting the responses of the first power generators 2a and the second power generators 2b, on the basis of the interconnection point power flow value measured in the local power plant 7a, the value reflecting the responses of the first power generators 2a. As will be described later, the gain set value is used in the control block unit 21.

Figure 11:
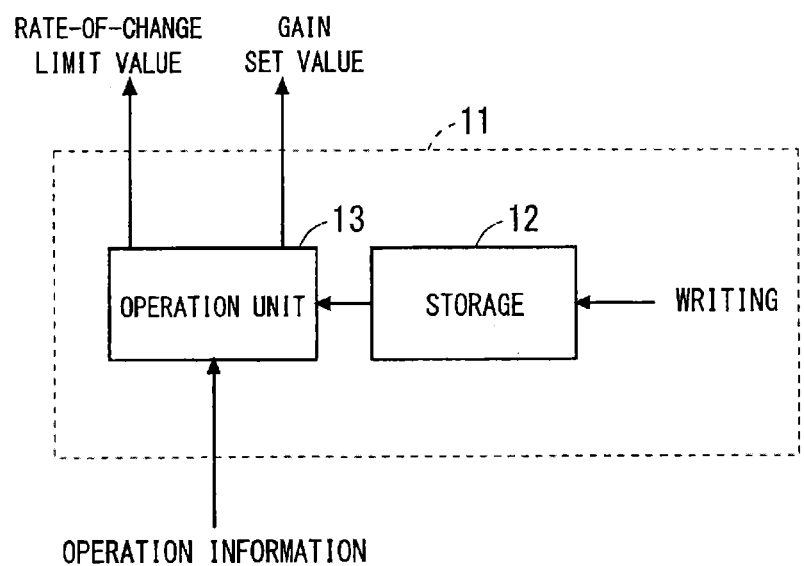
FIG. 11 is a block diagram showing a configuration of a parameter determination unit according to the second embodiment.

FIG. 11 is a block diagram showing a configuration of the parameter determination unit 11. As shown in FIG. 11, the parameter determination unit 11 according to the present embodiment includes the storage 12 and the operation unit 13, similarly to the parameter determination unit 11 of the first embodiment.

The storage 12 stores the above-described rate limit value (predetermined limit value). Assume here that all of the first power generators 2a and the second power generators 2b in the isolated island are adjusted to have the same rate limit value.

As in the first embodiment, the operation unit 13 calculates a rate-of-change limit value by performing a multiplication expressed by the following equation (2) on the basis of the rate limit value stored in the storage 12 and the operation information (in the present example, the total value of the rated outputs of all the first and second power generators 2a and 2b in operation) received from the supply-and-demand controller 6. Note that in the case where the first to Nth power generators are connected to the isolated island system 5, the rate-of-change limit value is calculated by replacing the "total of the rated outputs of the first and second power generators in operation" in the following equation (2) with a "total of rated outputs of the first to Nth power generators in operation."

[Equation 2]

$$\text{Rate-of-Change Limit Value} = \text{"Rate Limit Value"} \times \text{"Total of Rated Outputs of First and Second Power Generators in Operation"} \quad (2)$$

The operation unit 13 not only calculates the rate-of-change limit value, but also calculates the gain set value on the basis of at least the operation information. In the present example, the operation unit 13 calculates the gain set value by performing a computation expressed by the following equation (3) on the basis of the total value of the rated outputs of the first and second power generators 2a and 2b in operation, the total value being indicated by the operation information, and a total value of the rated outputs of the first power generators 2a in operation, the total value being indicated by the operation information. Note that in the case where the first to Nth power generators are connected to the isolated island system 5, the gain set value is calculated by replacing the "total of the rated outputs of the first and second power generators in operation" in the following equation (3) with a "total of rated outputs of the first to Nth power generators in operation."

[Equation 3]

Gain Set Value="Total of Rated Outputs of First and Second Power Generators in Operation"/"Total of Rated Outputs of First Power Generators in Operation"    (3)

Note that if the operation information indicates the number of first and second power generators 2a and 2b that are in operation, the gain set value may be calculated by using the rated output (predetermined information) per first power generator 2a (second power generator 2b) stored in the storage 12 as described in the first embodiment.

Now, the control block unit 21 shown in FIG. 10 generates the above-described command value on the basis of the rate-of-change limit value and the gain set value that are obtained by the parameter determination unit 11 and the interconnection point power flow value that is received from the first measuring instrument 9a, and outputs the command value to the first storage battery 3a.

Figure 12:
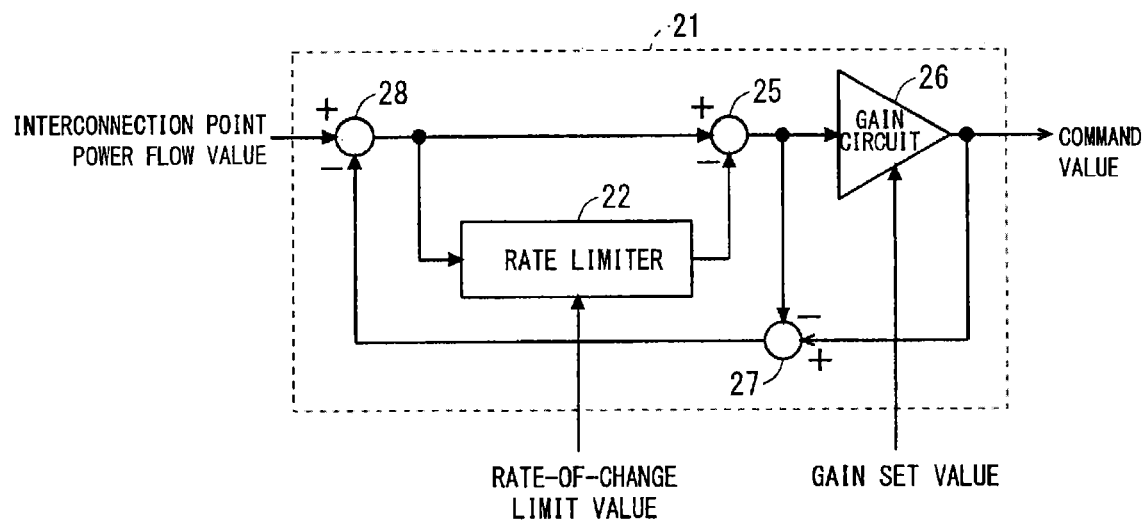
FIG. 12 is a block diagram showing a configuration of a control block unit according to the second embodiment.

FIG. 12 is a block diagram showing a configuration of the control block unit 21. As shown in FIG. 12, the control block unit 21 according to the present embodiment includes a rate limiter 22, a first subtractor 25, a gain circuit 26, and second and third subtractors 27 and 28.

The rate limiter 22 generates an input value (an output value of the third subtractor 28), whose change is limited by using the rate-of-change limit value. Note that the operation of using the rate-of-change limit value to limit the amount of change is the same as that described in the first embodiment.

The first subtractor 25 generates a first difference between the input values before and after the amount of change is limited by the rate limiter 22, and outputs the first difference to the gain circuit 26 and the second subtractor 27.

The gain circuit 26 amplifies the first difference received from the first subtractor 25 by multiplying the first difference by the gain set value obtained by the parameter determination unit 11 (operation unit 13) and takes the amplified value as a command value (control command) to be given to the first storage battery 3a. In other words, in the present embodiment, the supply-and-demand balance in the entire isolated island system 5 is calculated from the interconnection point power flow value measured in the local power plant 7a through the amplification by the gain circuit 26. Through this, it is possible to output the control command to stabilize the frequency of the entire isolated island system 5, to the first storage battery 3a.

On the other hand, the output of the first storage battery 3a that is added to the output of the local power plant 7a affects the interconnection point power flow value measured by the first measuring instrument 9a. Thus, the second and third subtractors 27 and 28 are additionally provided in order to correct this influence.

In the present example, the second subtractor 27 generates a second difference between the first difference and the command value. This yields the amount of increase (difference value) by which the output of the first storage battery 3a is increased in order to stabilize the entire isolated island system 5. The third subtractor 28 generates a third difference between the interconnection point power flow value received from the first measuring instrument 9a and the second difference as the input value of the rate limiter 22. Consequently, an interconnection point power flow value that is normally supposed to be measured (the outputs of the first power generators 2a under circumstances in which the first storage battery 3a is not used) is input to the rate limiter 22.

Figure 13A:
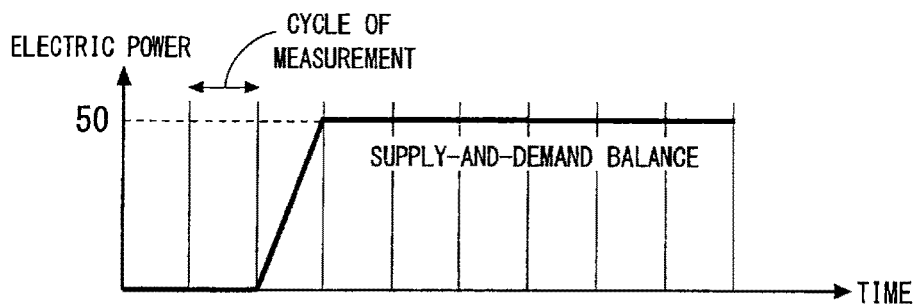
FIG. 13A to FIG. 13D each illustrates operations performed by the power system stabilizer according to the second embodiment.

Next, the operations performed by the power system stabilizer 1 having the above-described configuration according to the present embodiment will be described with reference to FIGS. 12 and 13A to 13D. FIG. 13A illustrates a temporal change in supply-and-demand balance, FIG. 13B illustrates temporal changes in the outputs of the local power generators (the outputs of the first power generators) and the outputs of the external power generators (the outputs of the second power generators), FIG. 13C illustrates a temporal change in the output of the first storage battery, and FIG. 13D illustrates a temporal change in the interconnection point power flow value.

Figure 13B:
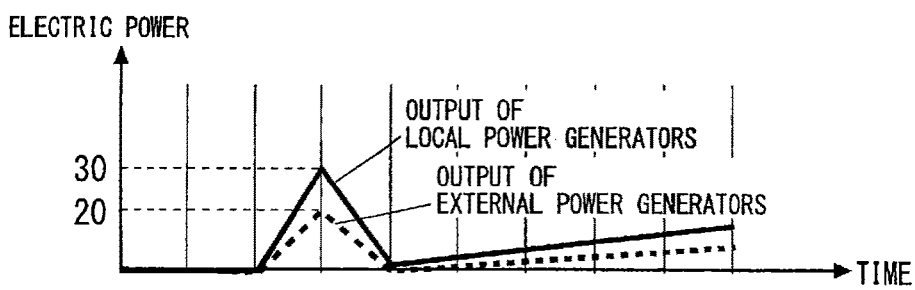
Figure 13C:
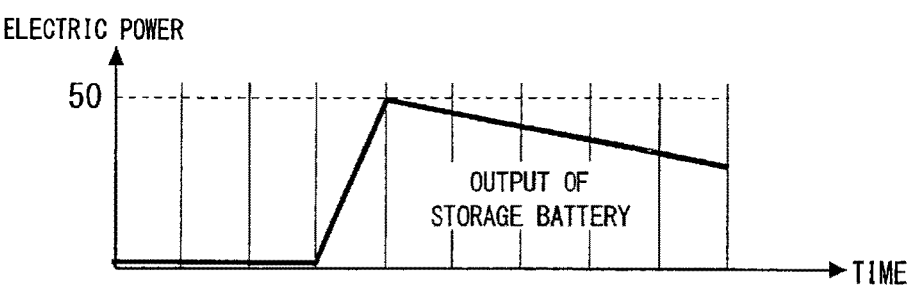
Figure 13D:
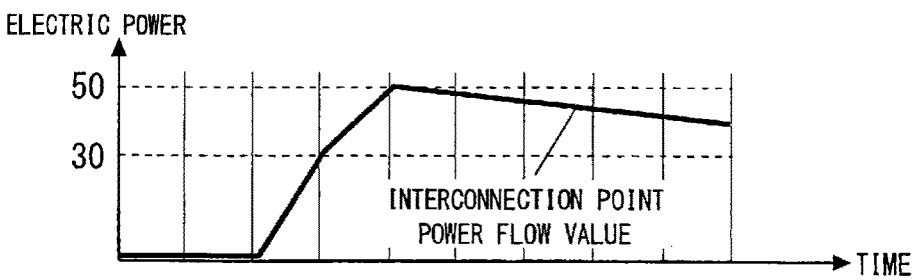

As shown in FIG. 13B, in response to a stepwise change in supply-and-demand balance, the first power generators 2a in the local power plant 7a and the second power generators 2b in the external power plant 7b share output depending on their operating conditions. The ratio at this time is determined by the ratio of the rated output between the first power generators 2a and the second power generators 2b. For example, in the case where the ratio of the rated output between the first power generators 2a and the second power generators 2b is 60:40, the parameter determination unit 11 calculates a gain set value of 100/60=1.67 from the above equation (3).

If the supply-and-demand balance in the entire isolated island system 5 has change to "50," the first power generators 2a outputs "30" of electric power and the second power generators 2b outputs "20" of electric power. Following this, the amount of change in the outputs of the first power generators 2a is reflected to the interconnection point power flow value of the first tie-line 4a measured by the first measuring instrument 9a. Then, the power system stabilizer 1 outputs, to the first storage battery 3a, a control command to output "50" of electric power by multiplying "30" of electric power output from the first power generators 2a by 1.67 through the amplification by the gain circuit 26, and the first storage battery 3a outputs "50" of electric power as shown in FIG. 13C. Accordingly, the supply-and-demand balance matches the output of the first storage battery 3a, and the outputs of the first power generators 2a and the second power generators 2b return to substantially "0." As a result, the first measuring instrument 9a measures "50" of electric power that is output from the first storage battery 3a as the interconnection point power flow value as shown in FIG. 13D.

On the other hand, in the control block unit 21 shown in FIG. 12, since the signal obtained before the amplification by the gain circuit 26 is "30" and the signal obtained after the amplification by the gain circuit 26 is "50," the second difference generated by the second subtractor 27 is "20." Since the interconnection point power flow value measured by the first measuring instrument 9a is "50" and the second difference is "20," the third difference generated by the third subtractor 28, i.e., the input value of the rate limiter 22, is "30." This state provides the same value as that immediately before the change in the supply-and-demand balance in the entire isolated island system 5. It can thus been seen that the control circuit of the present embodiment achieves stable operations.

As described above, with the power system stabilizer 1 according to the present embodiment, even if the second to Nth power generators are connected to the isolated island system 5 in addition to the first power generators 2a, it is possible to appropriately correct the amount of change in demand by using the first storage battery 3a in cooperation with the supply-and-demand controller 6.

Third Embodiment

Figure 14:
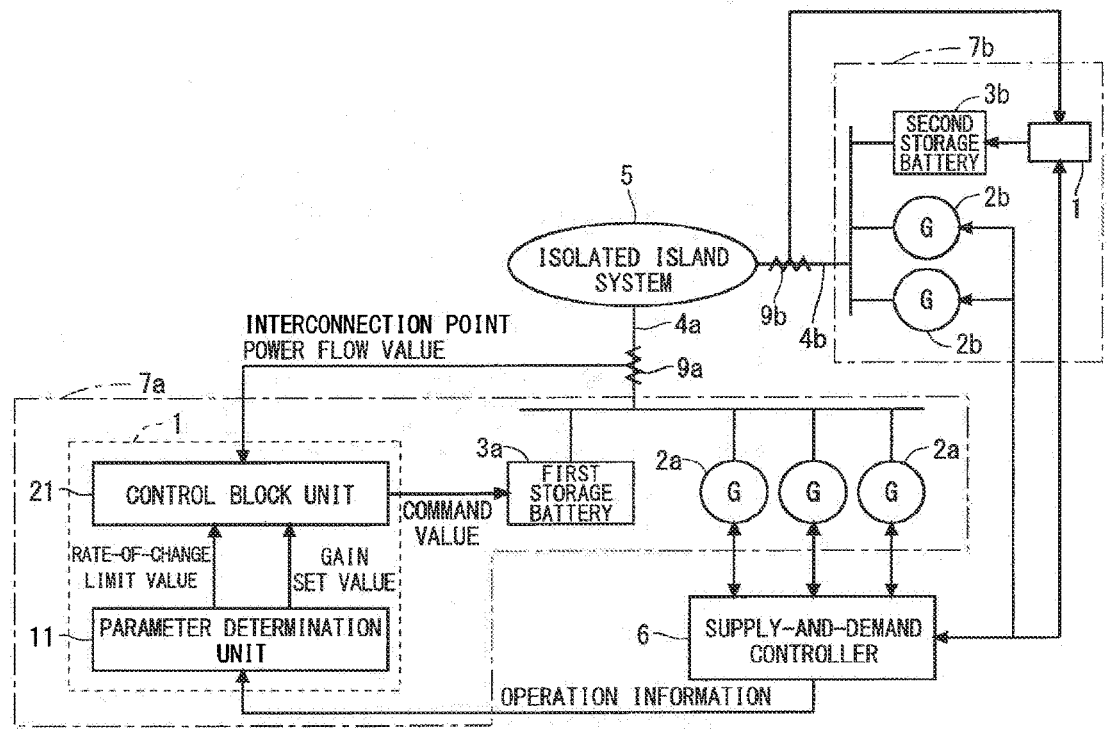
FIG. 14 is a block diagram showing configurations of a power system stabilizer according to a third embodiment and a power-system stabilization system that includes the power system stabilizer of the third embodiment.

FIG. 14 is a block diagram showing configurations of a power system stabilizer according to the present embodiment and a power-system stabilization system that includes the power system stabilizer of the present embodiment. Note that in the power system stabilizer and so on according to the present embodiment, constituent elements that are the same as or similar to those described in the second embodiment are denoted by the same reference numerals, and the following description focuses on differences from the second embodiment.

In the present embodiment, as in the configuration of the second embodiment, the power system stabilizer 1, a plurality of first power generators 2a, and a first storage battery 3a are connected to an isolated island system 5 via a first tie-line 4a, and a plurality of second power generators 2b are connected to the isolated island system 5 via a second tie-line 4b. However, the configuration of the present embodiment differs from that of the second embodiment in that another power system stabilizer 1 and a second storage battery 3b are also connected to the isolated island system 5 via the second tie-line 4b. The present embodiment is, however, not limited thereto, and a configuration is also possible in which second to Nth storage batteries are respectively connected to the isolated island system 5 via second to Nth tie-lines.

In the present example, it is assumed that the power system stabilizer 1, the plurality of first power generators 2a, and the first storage battery 3a are provided in a local power plant 7a, and the other power system stabilizer 1, the plurality of second power generators 2b, and the second storage battery 3b are provided in an external power plant 7b.

Note that a second measuring instrument 9b provided on the second tie-line 4b periodically measures an interconnection point power flow value that is a total value of outputs (effective electric power) of the second power generators 2b and the second storage battery 3b at the second tie-line 4b. The second measuring instrument 9b then periodically outputs the measured interconnection point power flow value to the power system stabilizer 1 provided in the external power plant 7b.

A supply-and-demand controller 6 according to the present embodiment periodically outputs operation information that includes information regarding the first and second power generators 2a and 2b that are in operation, to the power system stabilizers 1 in the local power plant 7a and the external power plant 7b. Assume here that the operation information is information indicating a total value of rated outputs of all the first power generators 2a that are currently in operation and a total value of all the second power generators 2b that are currently in operation.

Next is a description of a parameter determination unit 11 and a control block unit 21 provided in each power system stabilizer 1 according to the present embodiment. Note that the parameter determination unit 11 according to the present embodiment includes a storage 12 and an operation unit 13 as in the configuration of the parameter determination unit 11 of the second embodiment (FIG. 11). The control block unit 21 according to the present embodiment includes a rate limiter 22, a first subtractor 25, a gain circuit 26, and second and third subtractors 27 and 28 as in the configuration of the control block unit 21 of the second embodiment (FIG. 12).

The operation unit 13 of the parameter determination unit 11 according to the present embodiment calculates a rate-of-change limit value on the basis of the rate limit value stored in the storage 12 and the operation information received from the supply-and-demand controller 6 as in the second embodiment.

The operation unit 13 of the parameter determination unit 11 according to the present embodiment, however, differs from that in the second embodiment in that it calculates a gain set value by performing a computation expressed by the following equation (4) using the operation information and capacities of the first and second storage batteries 3a and 3b. Note that in the case where the first to Nth power generators and the first to Nth storage batteries are connected to the isolated island system 5, the gain set value is calculated by replacing the "total of the rated outputs of the first and second power generators in operation" and the "capacities of the first and second storage batteries" in the following equation (4) respectively with a "total of rated outputs of the first to Nth power generators in operation" and "capacities of the first to Nth storage batteries."

[Equation 4]

Gain Set Value="Total of Rated Outputs of First and Second Power Generators in Operation"/"Total of Rated Outputs of First Power Generators in Operation"×"Capacity of First Storage Battery"/ "Capacities of First and Second Storage Batteries" (4)

Next is a description of operations performed by the power system stabilizer 1 having the above-described configuration according to the present embodiment. In the present example, assume the case in which the total of the rated outputs of the first power generators 2a (local power generators) is "60," the total of the rated outputs of the second power generators 2b (external power generators) is "40," the capacity of the first storage battery 3a (the storage battery in the local power plant 7a) is "20," and the capacity of the second storage battery 3b (storage battery in the external power plant 7b) is "60." In this case, the parameter determination unit 11 on the local power plant 7a side calculates a gain set value of 100/60×20/80=0.417. The parameter determination unit 11 on the external power plant 7b side, on the other hand, calculates a gain set value of 100/40×60/80=1.875.

Here, if the supply-and-demand balance in the isolated island system 5 has changed to "50," the first power generators 2a output "30" of electric power and the second power generators 2b output "20" of electric power. Following this, the amount of changes in the outputs of the first power generators 2a is reflected to the interconnection point power flow value measured on the first tie-line 4a, and the amount of changes in the outputs of the second power generators 2b is reflected to the interconnection point power flow value measured on the second tie-line 4b.

On the local power plant 7a side, the power system stabilizer 1 outputs, to the first storage battery 3a, a control command to output "12.5" of electric power that is obtained by multiplying "30" of electric power output from the first power generators 2a by 0.417 through the amplification by the gain circuit 26, and the first storage battery 3a outputs "12.5" of electric power. On the external power plant 7b side, on the other hand, the power system stabilizer 1 outputs, to the second storage battery 3b, a control command to output "37.5" of electric power that is obtained by multiplying "20" of electric power output from the second power generators 2b by 1.875 through the amplification by the gain circuit 26, and the second storage battery 3b outputs "37.5" of electric power. Consequently, a total value of the outputs of the first and second storage batteries 3a and 3b becomes "50," which matches the amount of change in the supply-and-demand balance. Thereafter, the outputs of both of the first and second power generators 2a and 2b return to "0" to match the supply-and-demand balance. As a result, the first measuring instrument 9a measures "12.5" of electric power output from the first storage battery 3a as the interconnection point power flow value.

Meanwhile, in the control block unit 21 on the local power plant 7a side shown in FIG. 12, since the signal before the amplification by the gain circuit 26 is "30" and the signal after the amplification by the gain circuit 26 is "12.5," the second difference generated by the second subtractor 27 is "−17.5." Also, since the interconnection point power flow value measured by the first measuring instrument 9a is "12.5" and the second difference is "−17.5," the third difference generated by the third subtractor 28, i.e., the input value of the rate limiter 22, is "30." The control block unit 21 on the external power plant 7b side performs similar operations as described above, and accordingly the input value of the rate limiter 22 is "20." This state provides the same input values as those immediately before the change in the supply-and-demand balance in the entire isolated island system 5. It can thus been seen that the control circuit of the present embodiment achieves stable operations.

As described above, with the power system stabilizer 1 according to the present embodiment, even if the other power system stabilizer 1, the second power generators 2b, and the second storage battery 3b are also connected to the isolated island system 5 in addition to the first power generators 2a and the first storage battery 3a, it is possible to appropriately correct the amount of change in demand by using the first storage battery 3a and cooperating with the other power system stabilizer 1 and the supply-and-demand controller 6.

Fourth Embodiment

In the second embodiment, it is possible to consider the operating conditions of the second power generators 2b that are external power generators connected to the isolated island system 5 serving as an electric power system via another tie-line different from the first tie-line 4a. However, for example, in the case where all of the first power generators 2a have stopped while the second power generators 2b are in operation, the interconnection point power flow value on the first tie-line 4a will remain unchanged depending on external variable factors (operation of the second power generators 2b). Therefore, in such a case, information regarding the second tie-line 4b that interconnects the second power generators 2b in operation should be used, instead of the information regarding the interconnection point power flow value on the first tie-line 4a. The present embodiment describes such a configuration.

Figure 17:
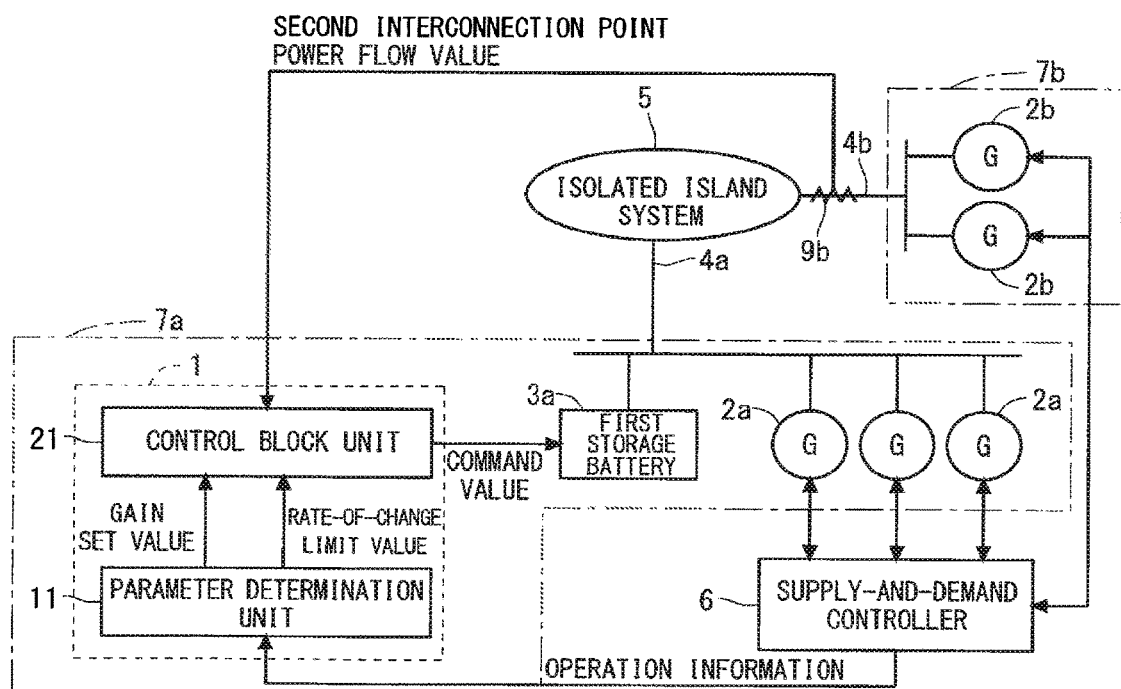
FIG. 17 is a block diagram showing configurations of a power system stabilizer according to a fourth embodiment and a power-system stabilization system that includes the power system stabilizer of the fourth embodiment.

FIG. 17 is a block diagram showing configurations of a power system stabilizer according to the present embodiment and a power-system stabilization system that includes the power system stabilizer of the present embodiment. Note that in the power system stabilizer and so on according to the present embodiment, constituent elements that are the same as or similar to those described in the second embodiment are denoted by the same reference numerals, and the following description focuses on differences from the second embodiment.

A parameter determination unit 11 of the power system stabilizer 1 obtains a rate-of-change limit value and a gain set value on the basis of operation information that includes information regarding first power generators 2a and second power generators 2b that are in operation, the rate-of-change limit value indicating a limit to be imposed on a total value of changes in the overall output of the first power generators 2a and the second power generators 2b in operation. The rate-of-change limit value and the gain set value are used in a control block unit 21 as described above and as will be described later. Note that the parameter determination unit 11 according to the present embodiment includes a storage 12 and an operation unit 13 as in the configuration of the parameter determination unit 11 of the second embodiment (FIG. 11).

As in the second embodiment, the operation unit 13 calculates the rate-of-change limit value by performing a multiplication expressed by the above equation (2) on the basis of a rate limit value stored in the storage 12 and the operation information (in the present example, a total value of rated outputs of all the first power generators 2a and the second power generators 2b in operation) received from the supply-and-demand controller 6.

The operation unit 13 not only calculates the rate-of-change limit value but also calculates the gain set value on the basis of at least the operation information. However, the operation unit 13 calculates the gain set value by performing a computation expressed by the following equation (5), instead of the above equation (3), on the basis of the total value of the rated outputs of the second power generators 2b and the second power generators 2b in operation, which is indicated by the operation information, and the total value of the rated outputs of the first power generators 2a in operation, which is also indicated by the operation information. The following equation (5) differs from the above equation (3) in that the denominator is changed from the "total of the rated outputs of the first power generators in operation" to the "total of the rated outputs of the second power generators in operation" so that the calculation is possible even if the total of the rated outputs of the first power generators 2a in operation is 0.

[Equation 5]

Gain Set Value="Total of Rated Outputs of First and Second Power Generators in Operation"/"Total of Rated Outputs of Second Power Generators in Operation" (5)

The control block unit 21 shown in FIG. 17 uses one of second to Nth interconnection point power flow values (total values of the outputs of the second to Nth power generators) measured respectively on the second to Nth tie-lines, instead of the first interconnection point power flow value that is the above-described interconnection point power flow value measured on the first tie-line 4a. In the present example, the control block unit 21 generates the above-described command value on the basis of the second interconnection point power flow value that is measured on the second tie-line 4b by the second measuring instrument 9b and the rate-of-change limit value and the gain set value that are obtained by the parameter determination unit 11, and outputs the generated command value to the first storage battery 3a.

Figure 18:
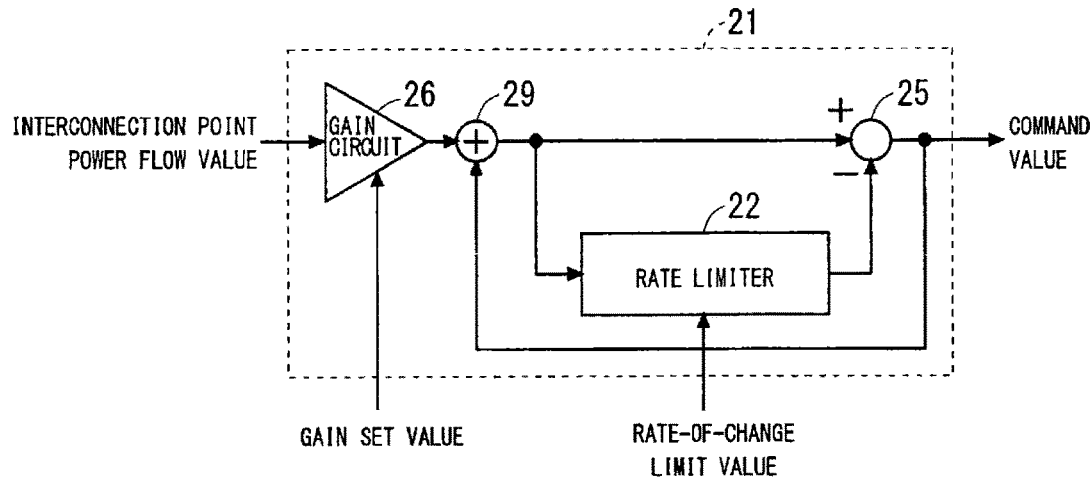
FIG. 18 is a block diagram showing a configuration of a control block unit according to the fourth embodiment.

FIG. 18 is a block diagram showing a configuration of the control block unit 21. As shown in FIG. 18, the control block unit 21 according to the present embodiment includes a rate limiter 22, a first subtractor 25, a gain circuit 26, and a first adder 29.

The rate limiter 22 generates an input value (an output value of the first adder 29), whose change is limited by using the rate-of-change limit value. Note that the operation of limiting the amount of change by using the rate-of-change limit value is the same as described in the first embodiment.

The first subtractor 25 generates a first difference between the input values before and after the amount of change is limited by the rate limiter 22, and outputs the first difference as a command value to the first storage battery 3a.

The gain circuit 26 amplifies the second interconnection point power flow value measured on the second tie-line 4b by multiplying the second interconnection point power flow value by the gain set value obtained by the parameter determination unit 11 (operation unit 13), and inputs the amplified value to the first adder 29. The first adder 29 adds the second interconnection point power flow value amplified by the gain circuit 26 and the command value given to the first storage battery 3a, and outputs the obtained value to the rate limiter 22.

As described above, the power system stabilizer 1 according to the present embodiment is configured to use the second interconnection point power flow value measured on the second tie-line 4b (one of the second to Nth interconnection point power flow values measured respectively on the second to Nth tie-lines), instead of the first interconnection point power flow value measured on the first tie-line 4a. In other words, as described above, the power system stabilizer 1 estimates a total of changes in the outputs of the first and second power generators 2a and 2b by amplifying the second interconnection point power flow value (the total value of the outputs of the second power generators 2b) in the gain circuit 26, and further calculates the supply-and-demand balance in the entire isolated island by adding the second interconnection point power flow value and the command value to be given to the first storage battery 3a. This allows the power system stabilizer 1 to exercise control for stabilizing the frequency of the entire isolated island system 5 even if all of the first power generators 2a have stopped.

Variations

Figure 19:
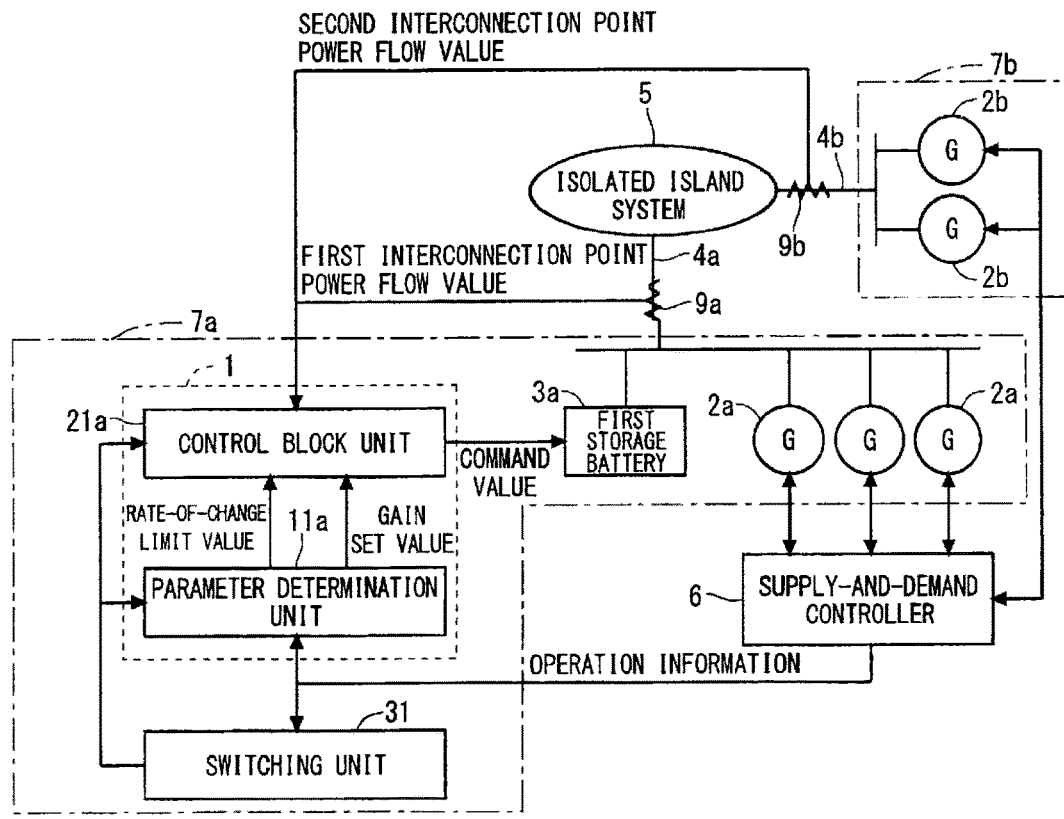
FIG. 19 is a block diagram showing configurations of a power system stabilizer according to a variation and a power-system stabilization system that includes the power system stabilizer of the variation.

FIG. 19 is a block diagram showing configurations of a power system stabilizer according to a variation and a power-system stabilization system that includes the power system stabilizer of the variation. This power system stabilizer 1 is configured to, for example, be able to selectively use the function described in the second embodiment and the function described in the fourth embodiment.

Specifically, a parameter determination unit 11a has a first determination function that is the same as the function of the parameter determination unit 11 according to the second embodiment, and a second determination function that is the same as the function of the parameter determination unit 11 according to the fourth embodiment. A control block unit 21a has a first control function that is the same as the function of the control block unit 21 according to the second embodiment, and a second control function that is the same as the function of the control block unit 21 according to the fourth embodiment.

A supply-and-demand controller 6 outputs information indicating whether or not all of the first power generators 2a have stopped, to a switching unit 31. When information indicating that all of the first power generators 2a have not stopped is received from the supply-and-demand controller 6, the switching unit 31 causes the parameter determination unit 11a to execute the first determination function and causes the control block unit 21a to execute the first control function. On the other hand, when information indicating that all of the first power generators 2a have stopped is received from the supply-and-demand controller 6, the switching unit 31 causes the parameter determination unit 11a to execute the second determination function and causes the control block unit 21a to execute the second control function.

With the above-described power system stabilizer 1 according to the variation, it is possible to exercise control for stabilizing the frequency of the entire isolated island system 5, regardless of whether or not all of the first power generators 2a have stopped.

It is to be understood that the embodiments of the present invention may be freely used in combination or may appropriately be modified, changed, or omitted in part without departing from the scope of the invention.

DESCRIPTION OF REFERENCE NUMERALS

1 Power system stabilizer
2a First power generator
2b Second power generator
3a First storage battery
3b Second storage battery
4a First tie-line
4b Second tie-line
5 Isolated island system
11 Parameter determination unit
12 Storage
13 Operation unit
21 Control block unit
22 Rate limiter
23 Subtractor
25 First subtractor
26 Gain circuit
27 Second subtractor
28 Third subtractor

The invention claimed is:

1. A power system stabilizer that issues a control command to a first storage battery among a plurality of first power generators and said first storage battery that are connected to an independent system for power supply via a first tie-line, the power system stabilizer comprising:

a parameter determination unit that obtains a rate-of-change limit value on the basis of operation information that includes information regarding those of said first power generators that are in operation, said rate-of-change limit value indicating a limit to be imposed on a total value of changes in an overall output of said first power generators in operation; and a control block unit that generates a command value to be given to said first storage battery on the basis of an interconnection point power flow value measured on said first tie-line and said rate-of-change limit value obtained by said parameter determination unit, said interconnection point power flow value being a total value of outputs of said first power generators and said first storage battery.

2. The power system stabilizer according to claim 1, wherein said parameter determination unit includes:

a storage that stores predetermined information including a predetermined limit value; and an operation unit that calculates said rate-of-change limit value on the basis of said predetermined information stored in said storage and said operation information.

3. The power system stabilizer according to claim 1, wherein said control block unit includes:

a rate limiter that generates said interconnection point power flow value, whose change is limited by using said rate-of-change limit value; and a subtractor that generates, as said command value, a difference between said interconnection point power flow values before and after the amount of change is limited by said rate limiter.

4. The power system stabilizer according to claim 1, wherein
a plurality of second power generators are respectively connected to said independent system via second to Nth tie-lines, where N is an integer of 2 or more,
said parameter determination unit obtains said rate-of-change limit value and a gain set value on the basis of said operation information that includes information regarding those of said first and second power generators that are in operation, said rate-of-change limit value indicating a limit to be imposed on a total value of changes in an overall output of said first and second power generators in operation, and
said control block unit generates said command value on the basis of said rate-of-change limit value and said gain set value that are obtained by said parameter determination unit and said interconnection point power flow value.

5. The power system stabilizer according to claim 4, wherein
said control block unit includes:
a rate limiter that generates an input value, whose change is limited by using said rate-of-change limit value;
a first subtractor that generates a first difference between said input values before and after the amount of change is limited by said rate limiter;
a gain circuit that multiples said first difference by said gain set value to generate said command value;
a second subtractor that generates a second difference between said first difference and said command value; and
a third subtractor that generates a third difference between said interconnection point power flow value and said second difference as said input value of said rate limiter.

6. The power system stabilizer according to claim 4, wherein
said parameter determination unit includes:
a storage that stores predetermined information including a predetermined limit value; and
an operation unit that calculates said rate-of-change limit value on the basis of said predetermined information stored in said storage and said operation information, and calculates said gain set value on the basis of at least said operation information.

7. The power system stabilizer according to claim 4, wherein
second to Nth storage batteries are respectively connected to said independent system by said second to Nth tie-lines, and
said parameter determination unit includes:
a storage that stores predetermined information including a predetermined limit value; and
an operation unit that calculates said rate-of-change limit value on the basis of said predetermined information stored in said storage and said operation information, and calculates said gain set value on the basis of at least said operation information and capacities of said first to Nth storage batteries.

8. The power system stabilizer according to claim 1, wherein
a plurality of second power generators are respectively connected to said independent system via second to Nth tie-lines, where N is an integer of 2 or more,
said parameter determination unit obtains said rate-of-change limit value and a gain set value on the basis of said operation information that includes information regarding those of said first and second power generators that are in operation, said rate-of-change limit value indicating a limit to be imposed on a total value of changes in an overall output of said first and second power generators in operation, and
said control block unit generates said command value on the basis of said rate-of-change limit value and said gain set value that are obtained by said parameter determination unit and one of second to Nth interconnection point power flow values, said second to Nth interconnection point power flow values being total values of outputs of said plurality of second power generators, respectively, and being respectively measured on said second to Nth tie-lines.

* * * * *